3,560,362
METHOD AND APPARATUS FOR PROMOTING CHEMICAL REACTIONS BY MEANS OF RADIOACTIVE INERT GASES
Tomomichi Kasamatsu and Norikatsu Ohtsuka, Takasakishi, and Kaname Matsumoto, Tokyo, Japan, assignors to Japan Atomic Energy Research Institute, Tokyo, Japan
Filed Aug. 1, 1967, Ser. No. 657,606
Claims priority, application Japan, Aug. 3, 1966, 41/50,501
Int. Cl. C08d 1/00; C08f 1/16
U.S. Cl. 204—159.22                                   6 Claims

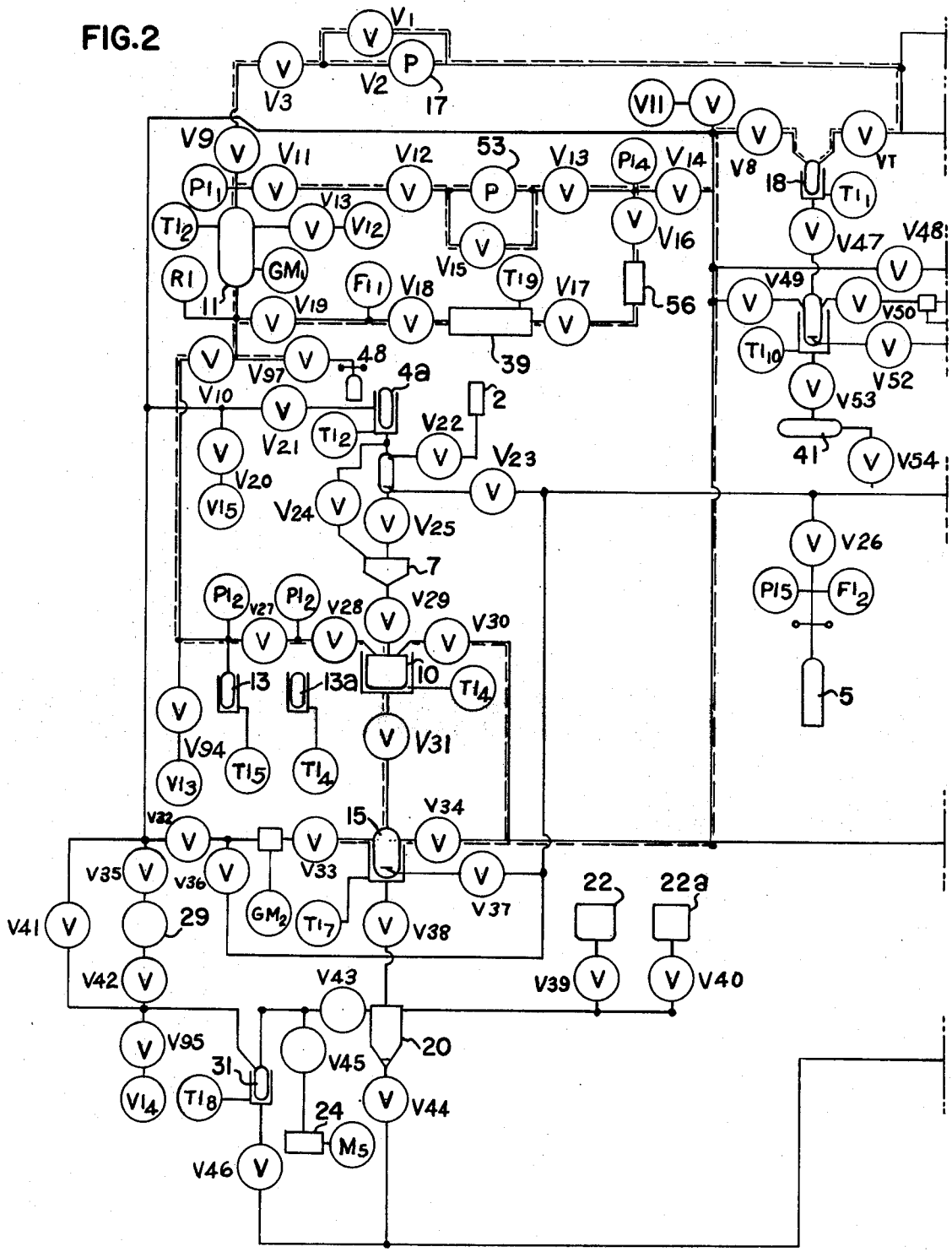

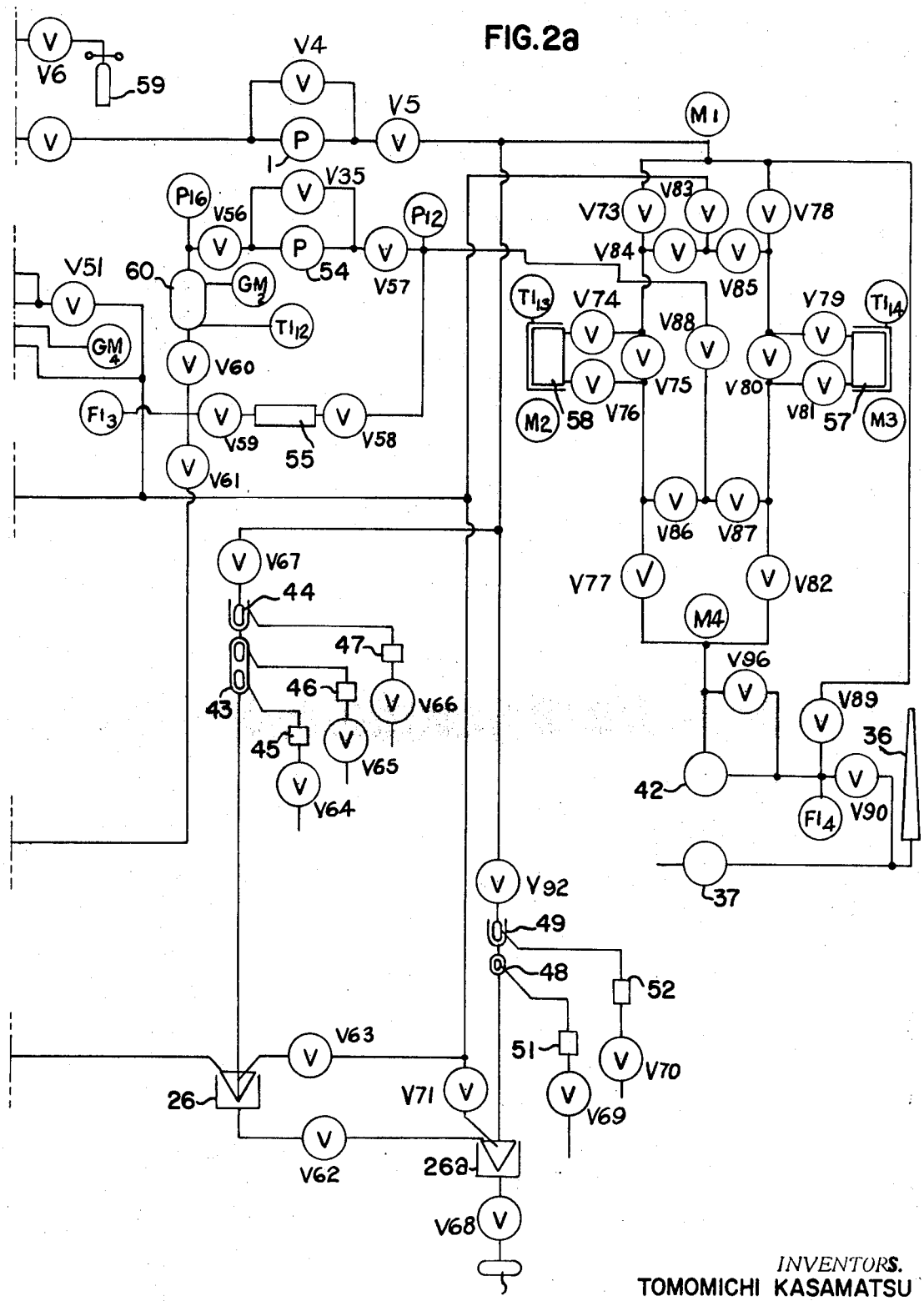

ABSTRACT OF THE DISCLOSURE

Chemical reactions are promoted by dissolving a radioactive inert gas in a liquid reaction system.

BACKGROUND AND SUMMARY OF THE INVENTION

The present invention relates to a method and apparatus for promoting chemical reactions by dissolving a radioactive inert gas under pressure in a liquid reaction system, including gaseous or solid reactants dissolved in a liquid. In such a system, 100% of the radiation energy of soft γ-rays or β-rays the penetrating range of which is very small may be utilized for promoting the reaction. After the reaction has been completed, the radioactive gas, which is chemically inert to the reactants, is completely removed and recovered from the reaction system so that no radioactivity remains in the product.

In U.S. application Serial No. 523,639, filed Jan. 28, 1966 by Tomomichi Kasamatsu, one of the joint inventors, a method and apparatus have been described, wherein a radioactive inert gas, with or without an inert gas which is not radioactive, is blown into a liquid reaction system to disperse the gas therein in the form of fine foam. Thus, the radiation energy, say of β-rays, of the radioactive gas may be effectively utilized in the large area of surface contact between the reaction system and the gas foam. Radiation efficiency (ratio of the total radiation energy entering the reaction system to that emitted by the gas in the reaction vessel) and absorption efficiency (coefficient of absorption of radiation energy by the reaction system) are almost 100%. However, the utilization efficiency (ratio of the amount of radioactive inert gas participating in the reaction to the total amount of gas introduced into the reaction vessel and circulating system) is small because the volume of the gas circulating system of the apparatus is large. Furthermore, the dispersion of the gas bubbles or foam in the liquid reaction system is not always uniform throughout the system. Accordingly, portions of the system may be deficient in radiation energy, which results in a lack of uniformity in the reaction product.

It is the primary object of the present invention to overcome these disadvantages and to provide a very high radiation dose rate in the liquid reaction system.

In order to utilize 100% of the radiation energy of β-rays and very soft γ-rays, it is necessary to remove radiation absorbing materials that may exist between the reaction system and the radiation source, to minimize the self-absorption of the radioactive gas, and to minimize or, if possible, entirely eliminate any radioactive gas existing outside the reaction system. To accomplish these results, a required amount of a radioactive inert gas is charged into the reaction vessel under high pressure so as to be dissolved and absorbed in the liquid reaction system. In this manner, a nearly 100% utilization efficiency is attained. Since the gas is dissolved, i.e. dispersed in, and mixed with, the reactants at the molecular level, self-absorption of the radiation energy by the gas itself becomes nil and radiation energy leaking out of the system is negligibly small.

In order to increase the absorption dose rate of the reaction system per unit volume, a nuclide having a high specific radioactivity and high energy must be used as the radiation source so as to increase the amount of the radioactive inert gas in contact with the reactants per unit volume. When the gas is mixed with the reactants in the form of a foam or bubbles, the radiation dose rate increases in proportion to the gas pressure. But self-absorption of radiation by the gaseous radiation source itself increases in proportion to the square of the gas presssure. Therefore, absorption of the radiation energy by the reaction system is not necessarily increased simply by increasing the gas pressure, and 100% of the radiation energy of the gas can never be utilized. Self-absorption of radiation energy by the gaseous radiation source is reduced as the diameter of the gas bubbles becomes smaller. If the gas is mixed with the reactants at the molecular scale, the radiation energy is utilized far more effectively. If the gas is dissolved in the reactants, self-absorption of radiation becomes nil and the radiation energy of, say, β-rays absorbed by the reactants is expressed by the following equation:

$$D = \bar{E}\lambda \frac{P_G}{R - P_G} \cdot \frac{N_o}{M_m} \text{ (mev./sec. g.)}$$

wherein $P_G$ is the pressure of the radioactive inert gas (kg./sq. cm.), R is the Henry constant (kg./sq. cm. mole fraction), $M_m$ is the average molecular weight of the reactants (grams), $N_o$ is the Avogadro number, $\bar{E}$ is the mean energy of the β-rays, and λ is the disintegration constant (sec.$^{-1}$).

In the method of the present invention, it is necessary to remove the radioactive inert gas from the reaction product and to recover the same after the reaction has been completed. This is effected by means of evacuation (degassing) at an elevated temperature where solubility of the gas is decreased, or continuous countercurrent gas elution.

BRIEF DESCRIPTION OF DRAWING

Other features and many of the attendant advantages of this invention will be readily appreciated as the same becomes better understood by reference to the following detailed description of certain preferred embodiments thereof, taken in conjunction with the accompanying drawing wherein FIGS. 2 and 2a show an embodiment of an apparatus useful in carrying out the invention.

DETAILED DESCRIPTION

Figure 1:
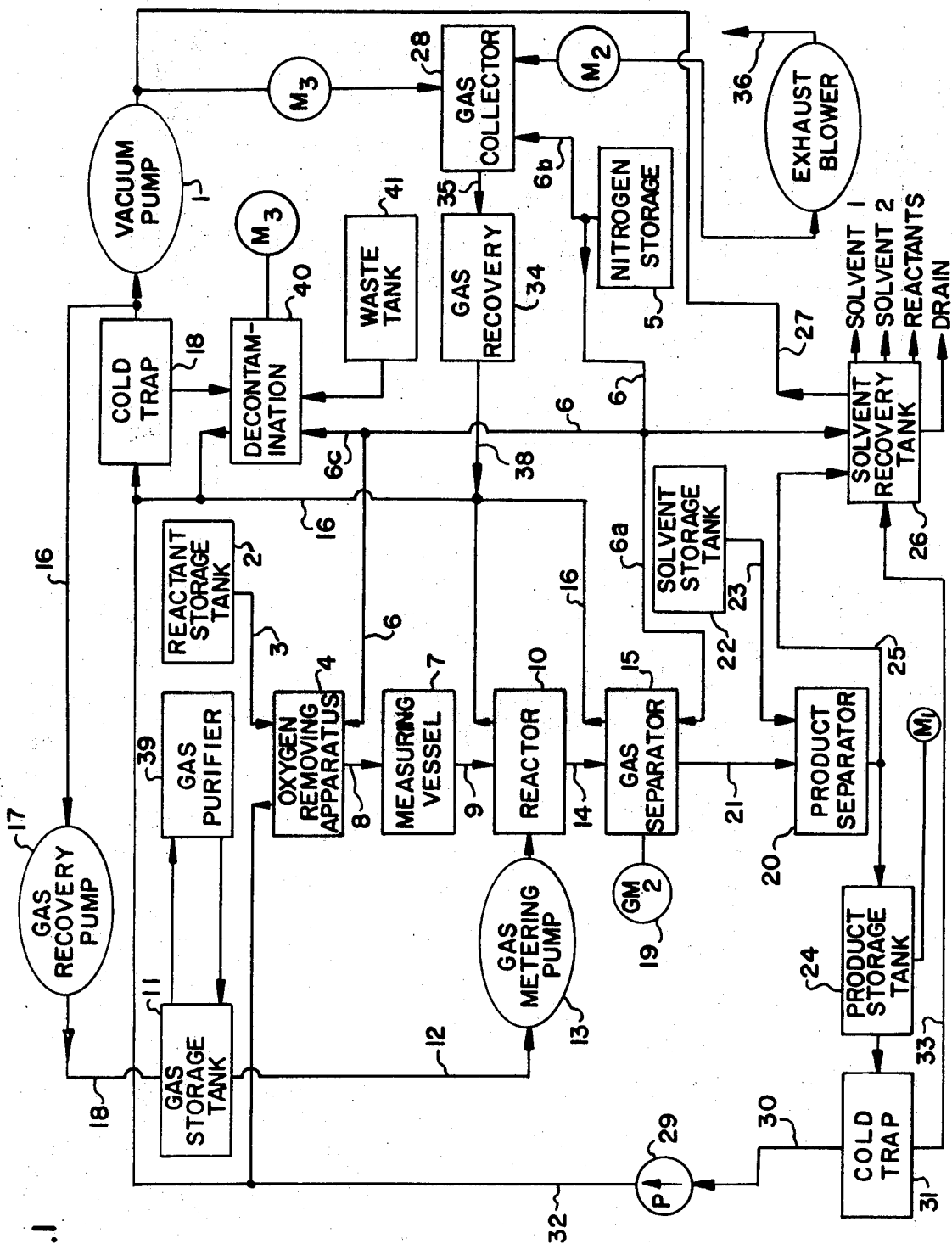
FIG. 1 shows the principle of the present invention in a flow diagram.

Referring now to the drawing and first to FIG. 1, the illustrated apparatus is shown to consist primarily of pressure-resistant vessels interconnected by conduits controlled by valves (not shown). Prior to operation, the entire system is evacuated by means of vacuum pump 1.

A storage tank 2 for the reactant, which may be a mixture of reactant compounds or elements, is connected by inlet conduit 3 to oxygen-removing apparatus 4. The oxygen-removing apparatus is a vessel equipped with valves and bubbling means. A bottle 5 of pure nitrogen (purity: 99.999%) is connected to the oxygen-removing apparatus 4 by supply line 6 to bubble pure nitrogen into the apparatus and remove any oxygen that may be present in the reactant and in the vessel. It is desirable to remove all oxygen since it usually operates as an inhibitor to the ensuing reaction.

The oxygen-free reactant is then fed through conduit 8 into measuring vessel 7 which may be equipped with a calibrated sight glass (not shown) and whence a predetermined amount of the reactant is fed through conduit 9 into reactor 10. Since the reactant moves in the direction of lower pressure, feeding is easy. The reactor is a pressure-resistant vessel equipped with valves and encased in a temperature-regulating jacket.

A suitable inert radioactive gas is stored in storage tank 11 whence the gas is fed through line 12 by metering pump 13 into the reactor 10 in predetermined amounts. In this manner, the reaction chamber in the reactor is placed under a predetermined pressure of the inert radioactive gas so that the gas is dissolved in the liquid reaction medium.

After the reaction has been completed, i.e. after a predetermined lapse of time, the contents of the reactor are transferred through conduit 14 into the gas separator 15. Gas recovery pump 17 removes the gas from separator 15 through exhaust line 16, which passes through cold trap 18, the output of pump 17 being connected to supply line 18 delivering the exhausted gas to storage tank 11. Any gas remaining dissolved in the reaction product is expelled as far as possible by bubbling the very pure nitrogen received through supply branch line 6a through the bottom of the separator 15. Geiger counter 19 attached to gas separator 15 monitors the concentration of the radioactive gas remaining in the reaction product.

The reaction product, which has been freed as much as possible from radioactive gas, is fed into the product separator 20 through conduit 21. Now begins the separation of unreacted starting materials and solvents used from the reaction product. If the reaction product is a solid polymer and the same is in the form of a solution, a poor solvent for the reaction product is introduced into the separator 20 from solvent storage tank 22 through conduit 23 so as to precipitate or salt out the solid polymer, leaving only unreacted starting material and low molecular polymers in the solution. The solid product is collected in storage tank 24 while the residual liquid portion is drained from the separator 20 through line 25 into solvent recovery tank 26. If the reaction product is liquid, it is separated from the solvent in the solvent recovery tank.

The solvent recovery tank includes a combination of multi-stage distillation apparatus and cold traps. The solvent used for dissolving the starting materials, the solvent used for precipitating the solid reaction product and any low molecular polymers and/or unreacted starting materials are here separated from each other. Nitrogen and any slight amount of radioactive gas remaining at this stage escapes through cold traps and these gases are delivered through conduit 27 to gas collector 28, conduit 27 also being connected to the output of the vacuum pump 1 to receive evacuated gases from the system.

Any remaining radiactive gas is removed from the reaction product by evacuating storage tank 24 by diffusion pump 29 whose input is connected to tank 24 by line 30 passing through cold trap 31. The diffusion pump is a mercury pump having a capacity of 200 l./sec. and an attainable vacuum of $10^{-6}$ mm. Hg. The cold trap 31 uses liquid nitrogen as cryogenic agent. Radiation monitor $M_1$ checks the amount of radioactivity remaining in the product in storage tank 24. The exhaust gas from the storage tank 24 is delivered by pump 29 through line 32 to cold trap 18 which also receives the exhausted gas containing a slight amount of solvent vapor from gas separator 15 through conduit 16. Line 33 connects the cold trap 31 with the solvent recovery tank 26.

The radioactive gas collector 28 comprises an adsorbing bed of activated carbon cooled with liquid nitrogen in a cryogenic system. Supply branch line 6b connects the nitrogen source 5 to the gas collector. On the basis of the difference in adsorptivity of the radioactvie gas and the nitrogen at very low temperatures, the radioactive gas portion of the exhausted gas is selectively trapped in the cooled adsorption bed. When the adsorption bed is saturated, cooling by liquid nitrogen is stopped, and the radioactive gas is desorbed or eluted by passing a small amount of highly pure nitrogen through the bed. The desorbed radioactive gas is delivered to gas recovery apparatus 34 through conduit 35. The specific radioactivity of the radiocative gas in the exhausted gas that remains in the collector 28 is measured by radiation monitor $M_2$. If necessary, it is diluted with nitrogen or air before being exhausted to stack 36 by fans 37.

Radioactive gas recovery apparatus 34 is an electric furnace containing magnesium beds in which the gas is heated so that the nitrogen used to elute the radioactive gas may be recated with the magnesium and the pure radioactive gas may be recovered. The recovered radioactive gas is fed by conduit 38 into the exhaust line 16 which delivers the gas through cold trap 18 into gas storage tank 11.

Despite the fact that the radioactive gas exhausted from reactor 10, gas separator 15 and gas recovery apparatus 34 first pass through cold trap 18 before it reaches its storage tank 11, the content of nitrogen and solvent vapor in the radioactive gas gradually increases after a number of cycles of use and recovery. Accordingly, a gas purifier 39 is attached to the storage tank, to which the gas is transferred for purification if the degree of contamination of the radioactive gas exceeds a predetermined standard. The purified gas is then returned to the storage tank 11. The gas purifier comprises an electric furnace with magnesium beds and electric furnace for burning the solvent vapors.

As the gas that passes through cold trap 18 is a mixture of radioactive gas, nitrogen and solvent vapor, the waste from the cold trap contains a small amount of radioactivity. Therefore, before disposal, the waste material drained from cold trap 18 is first sent to decontamination apparatus 40 where highly pure nitrogen from source 5 is received through supply branch line 6c and bubbled through the waste material so that the radioactive gas may be driven out of it. The decontaminated waste material is then transferred to waste tank 41 after radiation monitor $M_3$ attached to the decontamination apparatus has shown the radioactivity to be negligibly small.

In the embodiment of FIG. 2, the conduits or pipe lines indicated by an additional broken line carry high concentrations of radioactive gas. All piping, valves, pumps and vessels in contact with the reactants and the radioactive gas are made of stainless steel of the 18–8 type. Most of the tubes consituting the conduits have an inner diameter of 10 mm. and a thickness of 1 mm. Conduits subjected to high pressures are made of tubes of the same stainless steel but have an inner diameter of 2 mm. and a thickness of 2 mm. Those conduits carrying high concentrations of radioactive gas are shielded with 1 cm. thick lead plates. The valves are generally commercially available solenoid valves, high pressure solenoid valves being used in those sections of the apparatus subject to high pressures. The vacuum pump is a mercury jet pump with an evacuating capacity of 250 l./min., with a maximum attainable vacuum of $10^{-3}$ mm. Hg. The cold traps are conventional and use Dry Ice and methanol, being shielded by 1 cm. thick lead plates. The storage tank for the reactants is a stainless steel vessel of 5 l. capacity, and the oxygen removing apparatus is a similar vessel of 1 l. capacity, equipped with a bubbler at its bottom. The measuring vessel for the reactants is also of stainless steel and has a capacity of 500 ml., and the reactor is a stainless steel vessel of 500 ml. capacity and resistant to a pressure of 10 kg./sq. cm. In addition to being surrounded by a cooling jacket, it is also shielded by 6 cm. thick lead plates.

The storage tank for the radioactive gas is an 800 ml. stainless steel vessel shielded with 6 cm. thick lead plates. The gas metering pumps are cold trap type condensation pumps using liquid nitrogen as cryogenic material and resistant to pressures up to 300 kg./sq. cm. They are shielded by 5 cm. thick lead plates. The gas separator is a 1 l. stainless steel vessel equipped with a bubbler and a cooling jacket, shielded by 4 cm. thick lead plates. The gas recovery pump is a mercury jet pump similar to the vacuum pump, and is shielded by 3 cm. thick lead plates. The radioactive gas at the separator is monitored in a sampler consisting of a stainless steel vessel of 10 ml. capacity.

The product separator is a 2 l. stainless steel vessel equipped with a filter at its bottom for separating the solid reaction product from the liquid phase. The solvent storage tanks are 5 l. stainless steel vessels in which the desired solvents are stored. The product storage tank is a 2 l. stainless steel vessel with a bottom area of 1,000 sq. cm., equipped with a 0.5 kw. electric heater.

The decontamination apparatus for the waste materials is a 200 ml. iron vessel equipped with a bubbler at its bottom and the radioactivity of the waste material is monitored in a 10 ml. iron vessel sampler. The waste tank is a 1 l. iron vessel. The gas collectors are activated carbon traps cooled with liquid nitrogen. The blower or exhaust fans have a capacity of 200 cu. m./min. and the exhaust stack is 15.5 m. high. The tank for the gas recovery apparatus is an 800 ml. stainless steel vessel.

In the preferred apparatus of FIG. 2, commercially available 5% krypton 85 or 100% krypton 85 is used as the radioactive gas. The operation of this apparatus is illustrated by way of example with respect to a low temperature liquid phase polymerization of styrene as reactant in a methylene chloride solvent. Like parts are indicated by the same reference numerals as in the apparatus of FIG. 1 to simplify the description.

Of the valves VI–V97, all are solenoid valves, except for valves V54, V64, V65, V66, V68, V69, V70, and V97, which are manually operated.

Pressure indicators $Pi1$, $Pi4$, $Pi6$ and $Pi7$ are Bourdon gauges measuring pressures up to 1 kg./sq. cm. and indicating the same electrically. $Pi2$ and $Pi3$ are strain gauge pressure indicators measuring pressures up to 300 kg./sq. cm. $Pi5$ is a commercially available Bourdon gauge measuring pressures up to 5 kg./sq.cm.

Temperature indicators $Ti1$, $Ti3$, $Ti7$, and $Ti10$ are electric resistance thermometers measuring temperatures from —100° C. to +50° C., while the electric resistance thermometers $Ti2$ and $Ti12$ measure temperatures from 0° C. to 50° C., electric resistance thermometers $Ti15$, $Ti16$ and $Ti18$ measure temperatures from —200° C. to +50° C., thermoelectric thermometers $Ti9$ and $Ti11$ measure temperatures from 0° C. to 600° C., and electric resistance thermometers $Ti13$ and $Ti14$ measure temperatures from —200° C. to +200° C.

$Vi1$, $Vi2$ and $Vi3$ are thermocouple type vacuum gauges measuring pressures of $1-1\times10^{-3}$ mm. Hg; $Vi4$ is an ionization type vacuum gauge and $Vi5$ is a commercially available Geissler tube.

$Fi1$ and $Fi3$ are float type flow meters whose reading is electrically indicated, measuring a flow of up to 0.1 l./sec., while $Fi2$ and $Fi4$ are ordinary float type flow meters measuring up to 25 l./min.

RI is an apparatus which detects and measures gaseous impurities contained in the radioactive gas by measuring the difference of the thermal conductivity of the gases, detecting impurities up to 10 p.p.m.

GM1, GM3 and GM2, GM4 are Geiger counters measuring, respectively, 500 mc./cc.–50µc./cc. and 5 mc./cc.– $5\times10^{-3}$ µc./cc. M1, M2, M3 and M4 are scintillation counters whose measuring limit is $3\times10^{-3}$ µc./cc., and M5 is a scintillation counter whose measuring limit is $3\times10^{-7}$ µc./cc.

The cold condenser 4a attached to the oxygen removing apparatus 4 is a conventional condenser cooled with Dry Ice and methanol as cryogenic agent.

The gas metering pumps 13 and 13a, respectively, have a volume of 20 ml. and 1 ml.

The solvent and unreacted reactants recovery tanks 26 and 26a include stainless steel solvent distillation apparatus 43 and cold trap 44 using Dry Ice and methanol as a cryogenic agent, with solvent receiving vessels 45 and 46, and drain 47 being, respectively, 1 l., 2 l. and 100 ml. stainless steel vessels; and distiller 48 for unreacted reactants being a stainless steel distillation tower of 300 ml. capacity. Cold trap 49 attached to distiller 48 uses Dry Ice and methanol as cryogenic agents. Drain receiver 50, reactant receiver 51 and cold trap drain receiver 52 have respective capacities of 100 ml., 200 ml. and 100 ml.

Automatic Toepler pumps 53 and 54 attain a vacuum of $10^{-3}$ mm. Hg. The purifiers 39 and 55 are electric furnaces containing magnesium beds and able to be heated to a temperature up to 600° C. Trap 56 is a caustic alkali trap to collect water, carbon dioxide, etc. which evolve from the combustion of solvent vapor. The Toepler pumps, the purifiers and the trap 56 are shielded by 3 cm. thick lead plates. The amount of oxygen needed for the combustion of the solvent vapor is determined by reading the purity indicator RI, and oxygen is supplied from a small bottle containing 99.5% pure oxygen.

Most parts of this apparatus are placed into an air-tight radiation booth made of 4.5 mm. thick steel plates and having a dimension of 5 m. x 2 m. x 2 m. The booth has a peep window of flint glass, manipulating gloves in the front wall and an air-tight door in a side wall. The inside of the booth is kept at sub-atmospheric pressure by 20 mm. $H_2O$ to prevent leakage of the radioactive gas.

The operation of the valves, pumps, temperature and pressure regulation, vacuum and flow rate, as well as the detection and measurement of radioactivity are carried out by push button switches arranged on a control board outside the radiation booth.

The arrangement of the switches on the control board is schematically indicated hereinbelow. When no button is pushed, the apparatus is at a standstill and all valves are closed. When a button is pushed, the corresponding valve is opened or the corresponding pump starts working. The switches are so arranged on the control board that a desired operation of the apparatus may be effectuated when an operator pushes one button after another, following the order of arrangement. When a "reset" button R is pushed, all the buttons preceding that reset button on this line are restored to the inactive position.

In the following control board button arrangement scheme, each button is indicated by the part it actuates in the above-explained manner for the indicated operations:

The whole system is first evacuated by operating vacuum pump 1 and exhaust pump 42. This is effected by pushing 1. Evacuation     37 V90 42

2. Evacuation of conduits     V77 V76 V74 V73 V82 V81 V79 V78 V5 1 V6 V7 V8
    a) Gas Purifying lines     V14 V13 V12 V16 V17 V18 V19 V9 V3 V91 V93 V92     R
    b) Reactor lines     V20 V21 V25 V29 V28 V27 V94 V32 V33 V92     R
    c) Waste lines     V49 V50 V51 V53 V83 V92     R
    d) gas concentration     V61 V60 V56 V57 V58 V88 V92     R 3. Gas charge     V9 V3 17 V2 V91     R 4. Reactant charge     V22     R 5. Removal of oxygen     V5 1 V6 V9 V8 V20 V21 V23 V26     R 6. Measuring Reactants     V24 V25     R 7. Charging Reactor     V29 R V10 R V27 R V28     R 8. Recovery of gas     V31 V9 V3 17 V2 V7 V8 V30 V92     R 9. Removal of gas     V5 1 V6 V7 V8 V34 V37 V26 V32     R 10. Monitoring reactant     V33 Timer$_1$ V36 V26     R 11. Separation of product     V38 V39 Timer$_2$ V44 R V40 Timer$_3$ V44     R 12. Gas removal from product
    a)     V5 1 V6 V7 V8 V41 V43 V45 V95 V92     R
    b)     V5 1 V6 V7 V8 V35 29 V42 V45 V95 V92     R 13. Recovery of unreacted reactants     V46 R V67 V63 V26     R 14. Distillation of unreacted reactants     V62 R V72 V71 V26     R 15. Elution in gas collector 58     V56 V57 V88 V86 V76 V74 V84 V83 V26     R 16. Elution in gas collector 57     V56 V57 V88 V87 V81 V79 V85 V83 V26     R 17. Concentration of gas     V56 54 V57 V58 V59 V60     R 18. Recovery of gas     V9 V3 17 V2 V7 V8 V61 V60 V92     R 19. Gas purification     V11 V12 53 V13 V16 V17 V18 V19     R 20. Gas recovery from drain
    a)     V47     R
    b)     V5 1 V6 V7 V8 V49 V52 V26 V48     R 21. Monitoring drain     V50 Timer$_4$ V51 V26 R V53     R

— 14 —

Automatic Mechanism of Gas Collector

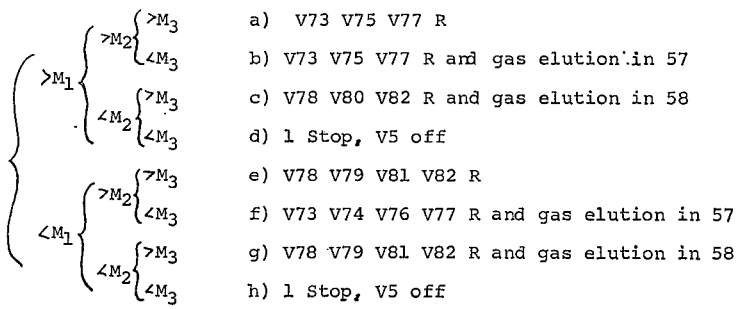

a) V73 V75 V77 R
b) V73 V75 V77 R and gas elution in 57
c) V78 V80 V82 R and gas elution in 58
d) 1 Stop, V5 off
e) V78 V79 V81 V82 R
f) V73 V74 V76 V77 R and gas elution in 57
g) V78 V79 V81 V82 R and gas elution in 58
h) 1 Stop, V5 off Safety Mechanism in Gas Exhaust

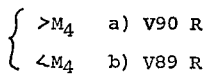

a) V90 R
b) V89 R

The above-described apparatus operates as follows in the liquid phase polymerization of styrene chosen by way of example:

of the control board. Kr–85 is charged from supply bottle as are the subsequent steps indicated in the above diagram the buttons on lines 1 and 2 of the control board in series, 59 into storage tank 11 by operation of pump 17. The concentration of the gas is measured by Geiger counter $GM_1$, pressure gauge $Pi1$ and temperature indicator $Ti2$. A mixture of purified styrene and methylene chloride is stored in tank 2 whence it is transferred to oxygen removing apparatus 4 into which highly pure nitrogen is blown so oxygen dissolved in the reactant mixture may be purged therefrom. The degree of oxygen removal is read from Geissler tube $Vi5$. After all oxygen has been removed, the reactant mixture is metered into measuring vessel 7 whence it is fed into reactor 10 which is cooled by a jacket containing Dry Ice and methanol.

The Kr–85 gas stored in tank 11 is transferred to the first vessel 13 of the gas metering pump which has been cooled by liquid nitrogen. The amount of gas transferred to the metering pump is determined from the decrease in the reading on $GM_1$ and $Pi1$. Then the second vessel 13a of the metering pump is cooled with liquid nitrogen, and the cooling jacket is removed from the first metering pump vessel. The Kr–85 is now transferred to the second metering pump vessel. Three hundred curies (corresponding to 0.73 g.) of Kr–85 is collected and valve V28 is then opened to transfer the gas into reactor 10 where it is dissolved in the reactant mixture. The cooling jacket is removed from the second metering pump vessel when valve V28 is opened.

After the reaction has been completed, valve V31 is open and the reaction product is moved to gas separator 15. An internal pressure decreases, the dissolved Kr–85 gas evolves into the head spaces of the reactor and the separator, and the evolved gas is returned to storage tank 11 by pump 17. The Kr–85 remaining in the reaction product is purged by blowing highly pure nitrogen from bottle 5 into the bottom of the gas separator while the same is cooled with a Dry Ice-methanol cryogenic agent. After the Kr–85 gas has been removed, a small portion of the reaction product is taken into a sampler to measure any remaining amount of 2r–85 by means of Geiger counter $GM_2$. If the remaining amount of Kr–85 is less than the allowable concentration, the reaction product is transferred to product separator 20 into which methanol is introduced from solvent storage tank 22 so that the produced polystyrene may be precipitated. The mother liquor is fed to recovery tank 26 for recovery of unreacted reactants and solvents through a filter at the bottom of the product separator. The polystyrene collected on the filter is washed with a methanol-methylene chloride mixture supplied from solvent storage tank 22a. The filter supporting the solid polystyrene is manually removed from the product separator and the polystyrene is transferred to product storage tank 24. The product separator 24 is evacuated by diffusion pump 29 until monitor $M_5$ indicates that the Kr–85 content has reached an allowable level.

The mother liquor and solvents are collected in tank 26 and fractionated in distilling tower 43. Methanol and methylene chloride are collected in vessels 45 and 46, respectively. Highly pure nitrogen from source 5 is blown into the distillers, and the Kr–85 gas separated at this stage is fed to gas collectors 57 or 58 through cold trap 44, together with the nitrogen. The accompanying organic vapors are collected in drain receiver 47 of cold trap 44. Residual styrene remaining in tank 26 is transferred to tank 26a where the styrene mixture is rectified in distiller 48. The rectified styrene is collected in receiver 51. Distillation of styrene is carried out while highly pure nitrogen is blown into the distiller under reduced pressure so that Kr–85 may be completely removed and transferred to the gas collector through cold trap 49, together with the nitrogen. The accompanying organic vapors are collected in drain receiver 52. The residue from tank 26a is collected in receiver 50.

The gas collector comprises a battery of two collectors 57, 58 arranged in parallel. These collectors are operated automatically, the selection of a respective one of the collectors being determined by the readings of monitors $M_1$, $M_2$ and $M_3$ in the following manner.

Monitor $M_1$ in the exhaust at the inlet of the gas collecting battery may indicate a radioactivity greater or less than a predetermined value ($<M_1$ or $>M_1$ in the above-described Automatic Mechanism of Gas Collector). In case of $>M_1$, there is no need to collect Kr–85 and the exhaust gas is led directly to exhaust pump 42 without passing through the collectors, being exhausted through stack 36. In case of $<M_1$, collection of Kr–85 is necessary before permitting exhaustion. If one of the collectors is already saturated the other collector is selected and, as Kr–85 is being collected in the collector which is not saturated, highly pure nitrogen is circulated through the other collector at high temperature so that the adsorbed Kr–85 is eluted. The eluted Kr–85 is pumped to tank 60 for purification. If monitors $M_2$ and $M_3$ both show saturation, the vacuum pump 1 automatically stops and valve V5 at the inlet of the exhaust system is closed to disconnect the exhaust system from the vacuum pump discharge to which it is connected. In the above-described Automatic Mechanism of Gas Collector, $<M_2$ corresponds to a stage wherein the Kr–85 amount adsorbed in collector 58 has reached saturation, $>M_2$ meaning that it has not yet reached saturation. $<M_3$ means that the Kr–85 concentration in collector 57 has reached saturation, while $>M_3$ indicates that it has not yet reached saturation.

The Kr–85 stored in tank 60 is then pumped to electric furnace purifier 55 wherein nitrogen is removed from the radioactive gas by reaction with the magnesium beds in the furnace, and the Kr–85 is concentrated. The degree of concentration of the Kr–85 is checked by $Pi6$, and the concentrated Kr–85 is pumped to tank 11.

As recovery of Kr–85 is repeated, gaseous contaminants are accumulated therein in storage tank 11 so that purification of its gaseous contents becomes necessary. This is effected in electric furnace purifier 39 whereto the gas is pumped by Toepler pump 53. Gases other than Kr–85 are burned and nitrided in the purifier.

When the reaction operation has been completed, a considerable amount of liquid is accumulated in cold trap 18, in which a small amount of Kr–85 is dissolved. Before this liquid is discarded, the Kr–85 must be removed therefrom. Therefore, the liquid is drained from the cold trap into decontamination vessel 40 through whose bottom highly pure nitrogen is blown to expel the dissolved Kr–85. A small portion of the waste liquid is taken into a sampler where the concentration of dissolved Kr–85 is checked by Geiger counter $GM_4$. After the concentration has been confirmed to be less than the allowable limit, the waste liquid is removed to waste tank 41. The time lag of the timers indicated on the control switch board is less than one minute.

Safety in the gas exhaust portion of the apparatus is assumed by linking monitor $M_4$ and valves V89 and V90 in operation. When $M_4$ indicates a radioactivity below a predetermined value (corresponding to $>M_4$ in the above-described Safety Mechanism in Gas Exhaust), V90 is open and exhaust gas is diluted with a large amount of air supplied by blower 37 before being released through stack 36. However, if $M_4$ indicates excessive radioactivity ($<M_4$ in the Safety Mechanism), valve V90 is closed and valve V89 is opened to return the exhaust gas to one of the gas collectors 57, 58.

Vacuum pump 1, gas recovery pump 17, Toepler pumps 53 for the gas purification and 54 for the gas concentration, and exhaust pump 42 are respectively combined with valves V4, V1, V15, V55 and V96 in parallel for the purpose of safety. They are so designed that the valves are closed when the pumps are operated and open when the pumps are idle.

The following specific examples illustrate the practice of this invention in the apparatus of FIG. 2 without in any way limiting the same thereto.

EXAMPLE 1

Five hundred milliliters (500 cc.) of a mixture (1:3 by volume) of styrene and methylene chloride were charged into the reactor and 300 curies of Kr–85 were dissolved in the mixture. The reaction was maintained for four hours while the reactor was cooled with a Dry Ice-methanol cryogenic agent. After the reaction was completed, the produced polymer was precipitated by adding methanol, and the precipitated polymer was recovered. The radiation dose rate was $2.5 \times 10^5$ rad/hour, the yield was 7.06 grams and the average molecular weight was $8.3 \times 10^4$.

EXAMPLE 2

Three hundred curies of Kr–85 were dissolved in 500 cc. of a mixture of methyl methacrylate and carbon tetrachloride, and the reaction was continued at room temperature for two hours. After completion of the reaction, the polymer was separated from the reaction mixture and washed with toluene. The radiation dose rate was $2.4 \times 10^5$ rad/hour, the yield of polymethyl methacrylate was 36.8 grams, and its average molecular weight was $9.0 \times 10^4$.

EXAMPLE 3

Acrylamide was polymerized in the same way as in Example 1. Thirty curies of Kr–85 dissolved in 500 cc. of 20% aqueous solution of acrylamide, and the reaction was continued at room temperature for ten minutes. After completion of the polymerization, methanol was added to the reaction mixture to precipitate the produce polyacrylamide. The radiation dose rate was $3.0 \times 10^4$ rad/hour, the polymer yield was 49.0 grams and the average molecular weight of the polymer was $8.9 \times 10^6$.

EXAMPLE 4

The radiation dose rate was measured with respect to water in the apparatus of FIG. 2. A piece of a plastic dosimeter was first placed in the reactor. Thereafter, in the same way as in the foregoing examples, 300 curies of Kr–85 was dissolved in 500 cc. of distilled water in the reactor, which was kept at room temperature for one hour. The plastic dosimeter was then taken out and its discoloration was measured by a photospectrometer to calculate the dose rate of the radiation adsorbed by the distilled water. From the result of the spectrometry, the dose rate was calculated as $3.1 \times 10^5$ rad/hour while the theoretically calculated value is $2.9 \times 10^5$ rad/hour.

While Examples 1–3 illustrate the polymerization of organic compounds, it will be obvious that the method and apparatus may be used in any chemical reaction which is induced or promoted by radiation, and may be applied to many other free radical reactions. The reactants may be liquid or gas, or a solid dissolved in a suitable solvent.

While the invention has been exemplified herein by the use of krypton 85 as the inert radioactive gas because its half life is long and it is, therefore, the most suitable gas, such radioactive noble gases as argon 41 and xenon 133, for example, are also useful. The boiling points, melting points and half life of these gases is as follows:

|    | B.P., °C. | M.P., °C. | Half life |
|----|-----------|-----------|-----------|
| Ar | −186      | −190      | 109 minutes. |
| Kr | −152.3    | −157.3    | 10.3 years. |
| Xe | −109      | −140      | 5.27 days. |

Since the boiling point of the above radioactive gases is higher than that of nitrogen (−196° C.), nitrogen may be used for the purpose of entraining, expelling and cooling the radioactive gas.

It is evident from the preceding description that this invention provides a practical method for carrying out reactions in the field of radiation chemistry by dissolving a radioactive inert gas in a liquid reaction system under high pressure.

While specific apparatus has been described and illustrated, many variations and modifications will readily occur to those skilled in the art, particularly after benefiting from the present teaching, without departing from the spirit and scope of the present invention as defined by the appended claims. For instance, the exemplified mercury jet pumps may be replaced by electromagnetic or other types of pumps. The exemplified removal of nitrogen in the purification stage by heating the gas in the presence of magnesium may instead be effected by fractional distillation. Similar substitutions of equivalent procedures or features may obviously be effected.

We claim:

1. In a method of promoting a reaction in a liquid reaction medium containing at least one reactant, wherein a radioactive gas is passed through said medium in direct contact therewith in a reaction-promoting amount, the gas being inert to said medium and said reactant, the improvement of dissolving all of said gas in said reaction medium by finely dispersing said gas at the molecular level in said medium.

2. In the method of claim 1, the amount of said gas giving a dose rate of at least $3 \times 10^4$ rad/hour.

3. In the method of claim 1, wherein said gas is substantially completely removed from said reaction medium after the completion of the reaction.

4. The method of claim 1, wherein said gas is a noble gas.

5. The method of claim 4, wherein said gas is krypton 85.

6. In the method of claim 1, wherein said gas is delivered to the reaction medium under sufficient pressure to dissolve all of said gas therein.

References Cited

UNITED STATES PATENTS 3,100,185   8/1963   Ambrose et al. _____ 204—162

OTHER REFERENCES

Manowitz, The Industrial Future, Nucleonics, October 1953, pp. 18–20.

MURRAY TILLMAN, Primary Examiner

R. B. TURER, Assistant Examiner

U.S. Cl. X.R.

250—44